(12) United States Patent
Kozlovsky et al.

(10) Patent No.: US 10,042,572 B1
(45) Date of Patent: Aug. 7, 2018

(54) OPTIMAL DATA STORAGE CONFIGURATION

(71) Applicant: EMC Corporation, Hopkinton, MA (US)

(72) Inventors: Vitaly Kozlovsky, St. Petersburg (RU); Yuri Zagrebin, St. Petersburg (RU); Ivan Gumenyuk, St. Petersburg (RU); David M. Zeryck, Portland, OR (US)

(73) Assignee: EMC IP Holdings Company LLC, Hopkinton, MA (US)

( * ) Notice: Subject to any disclaimer, the term of this patent is extended or adjusted under 35 U.S.C. 154(b) by 0 days.

(21) Appl. No.: 13/804,596

(22) Filed: Mar. 14, 2013

(51) Int. Cl.
*G06F 3/06* (2006.01)
*H04L 12/24* (2006.01)

(52) U.S. Cl.
CPC ........ *G06F 3/0629* (2013.01); *H04L 41/0823* (2013.01)

(58) Field of Classification Search
CPC .................................................. G06F 3/0605
See application file for complete search history.

(56) References Cited

U.S. PATENT DOCUMENTS

| | | | |
|---|---|---|---|
| 6,850,968 B1 * | 2/2005 | Pfeffer | G06Q 10/107 709/206 |
| 6,978,259 B1 * | 12/2005 | Anderson | G06F 3/0605 706/19 |
| 7,035,919 B1 * | 4/2006 | Lee | H04L 67/1095 709/203 |
| 7,080,229 B2 * | 7/2006 | Manbert et al. | 711/170 |
| 7,356,452 B1 * | 4/2008 | Naamad et al. | 703/22 |
| 7,484,132 B2 * | 1/2009 | Garbow | G06F 11/008 714/26 |
| 7,634,567 B1 * | 12/2009 | Wood et al. | 709/226 |
| 7,856,497 B2 * | 12/2010 | McKinnon, III | H04L 12/2801 709/224 |
| 8,046,477 B1 * | 10/2011 | Arutla et al. | 709/229 |
| 8,095,764 B1 * | 1/2012 | Bauer et al. | 711/170 |
| 8,347,058 B1 * | 1/2013 | Knight | G06F 3/0605 709/220 |
| 8,370,194 B2 * | 2/2013 | Dwarakanath | G06Q 30/0202 705/7.37 |
| 8,769,059 B1 * | 7/2014 | Chheda et al. | 709/220 |
| 8,799,368 B2 * | 8/2014 | Clarke | G06F 9/546 709/206 |

(Continued)

*Primary Examiner* — Jimmy H Tran
(74) *Attorney, Agent, or Firm* — Krishnendu Gupta; Jason A. Reyes

(57) ABSTRACT

There is disclosed techniques for use in providing an optimal configuration for a data storage system. In one example, a method comprises the following steps. A request is received from a user to assist in the configuration of the data storage system. The request is received remote from the data storage system and includes values of application workload parameters. Optimal configuration parameters are determined for the data storage system in response to receiving the request. The optimal configuration parameters are determined based on the application workload parameters and one of a model and application best practices. Additionally, the optimal configuration parameters are provided to a target system such that the target system is able to establish the optimal configuration for the data storage system.

3 Claims, 8 Drawing Sheets

(56) References Cited

U.S. PATENT DOCUMENTS

| | | | | |
|---|---|---|---|---|
| 8,856,241 B1* | 10/2014 | Derhak | .................... | H04L 51/00 |
| | | | | 709/206 |
| 8,914,527 B2* | 12/2014 | Desai | .................... | G06F 9/5083 |
| | | | | 709/227 |
| 8,935,213 B2* | 1/2015 | Baessler | .............. | G06Q 10/107 |
| | | | | 707/665 |
| 9,075,665 B2* | 7/2015 | Holden | ................. | G06F 9/5083 |
| 9,285,992 B2* | 3/2016 | Forgette | ................ | G06F 3/0605 |
| 9,300,536 B2* | 3/2016 | Agarwala | ........... | H04L 41/0836 |
| 2006/0095244 A1* | 5/2006 | Messick | ........................... | 703/21 |
| 2007/0073720 A1* | 3/2007 | Clarke | .................... | G06F 9/546 |
| 2007/0101202 A1* | 5/2007 | Garbow | ................. | G06F 11/008 |
| | | | | 714/47.2 |
| 2008/0140469 A1* | 6/2008 | Iqbal | ...................... | G06Q 10/04 |
| | | | | 705/7.37 |
| 2009/0070454 A1* | 3/2009 | McKinnon, III | ... | H04L 12/2801 |
| | | | | 709/224 |
| 2010/0185499 A1* | 7/2010 | Dwarakanath | ......... | G06Q 10/04 |
| | | | | 705/7.31 |
| 2010/0205541 A1* | 8/2010 | Rapaport | ............... | G06Q 10/10 |
| | | | | 715/753 |
| 2011/0078318 A1* | 3/2011 | Desai | .................... | G06F 9/5083 |
| | | | | 709/228 |
| 2011/0320546 A1* | 12/2011 | Holden | ................. | G06F 9/5083 |
| | | | | 709/206 |
| 2012/0023226 A1* | 1/2012 | Petersen | ................. | H04W 4/18 |
| | | | | 709/224 |
| 2012/0198058 A1* | 8/2012 | Pogorelik | .............. | G06Q 10/04 |
| | | | | 709/224 |
| 2012/0259817 A1* | 10/2012 | Baessler | .............. | G06Q 10/107 |
| | | | | 707/665 |
| 2014/0115579 A1* | 4/2014 | Kong | .................... | G06F 3/0605 |
| | | | | 718/1 |

* cited by examiner

OPTIMAL DATA STORAGE CONFIGURATION

TECHNICAL FIELD

This application relates generally to a data storage system, and more particularly to providing an optimal configuration for a data storage system.

BACKGROUND OF THE INVENTION

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Different tasks may be performed in connection with a data storage system. For example, a customer may perform data storage configuration tasks. Such tasks may include, for example, configuring storage for use with an email application. In connection with the configuration processing, tasks may include allocating storage, specifying the logical and/or physical devices used for the storage allocation, specifying whether the data should be replicated, the particular RAID (Redundant Array of Independent or Inexpensive Disks) level, and the like. With such options in connection with performing the configuration, a customer may not have the appropriate level of sophistication and knowledge needed.

Thus, it may be desirable to utilize a technique which assists customers in connection with performing data storage services such as related to data storage configuration.

SUMMARY OF THE INVENTION

There is disclosed a computer-implemented method for use in providing an optimal configuration for a data storage system. The method comprising: receiving, from a user, a request to assist in the configuration of the data storage system, wherein the request is received remote from the data storage system and includes values of application workload parameters; determining optimal configuration parameters for the data storage system in response to receiving the request, wherein the optimal configuration parameters are determined based on the application workload parameters and one of a model and application best practices; and providing the optimal configuration parameters to a target system such that the target system is able to establish the optimal configuration for the data storage system.

There is also disclosed a system for use in providing an optimal configuration for a data storage system, the system comprising: a network interface; memory; and a controller including controlling circuitry coupled to the memory, the controlling circuitry being constructed and arranged to: receive, from a user, a request to assist in the configuration of the data storage system, wherein the request is received remote from the data storage system and includes values of application workload parameters; determine optimal configuration parameters for the data storage system in response to receiving the request, wherein the optimal configuration parameters are determined based on the application workload parameters and one of a model and application best practices; and provide the optimal configuration parameters to a target system such that the target system is able to establish the optimal configuration for the data storage system.

There is further disclosed a computer program product having a non-transitory, computer-readable storage medium which stores code to provide an optimal configuration for a data storage system, the code including instructions to: receive, from a user, a request to assist in the configuration of the data storage system, wherein the request is received remote from the data storage system and includes values of application workload parameters; determine optimal configuration parameters for the data storage system in response to receiving the request, wherein the optimal configuration parameters are determined based on the application workload parameters and one of a model and application best practices; and provide the optimal configuration parameters to a target system such that the target system is able to establish the optimal configuration for the data storage system.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

The invention can be implemented in numerous ways, including as a process, an apparatus, a system, a computer program embodied on a computer readable storage medium, and/or a processor, such as a processor configured to execute instructions stored on and/or provided by a memory coupled to the processor. In this specification, the implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

It should be appreciated that data storage systems can include complex arrangements of storage disk arrays, configuration management interfaces and storage processors. A person seeking to configure a data storage system faces many choices in configuring the data storage system, many of which may result in suboptimal performance. Along these lines, advice may be sought with regard to the configuration of a data storage system.

There is disclosed herein an advisory system with the ability to provide optimal storage configuration for a data storage system in response to receiving workload characteristics and performance/capacity requirements for the data storage system. For example, the advisory system can be extremely beneficial during sales negotiations in which a pre-sales analysis is required to determine if system configuration and hardware can satisfy a customer's requirements. Based on the inputted workload characteristics and performance/capacity requirements, the advisory system can compose the best matching system specification and generate recommendations on how to configure the data storage system. For example, the LUN, pool, tier, RAID combinations and workload allocation, etc. The advisory system further creates a configuration file specific to a target system (e.g., management system/data storage system) and provides the configuration file to the target system such that the target system is able to establish the optimal configuration for the data storage system.

Figure 1:
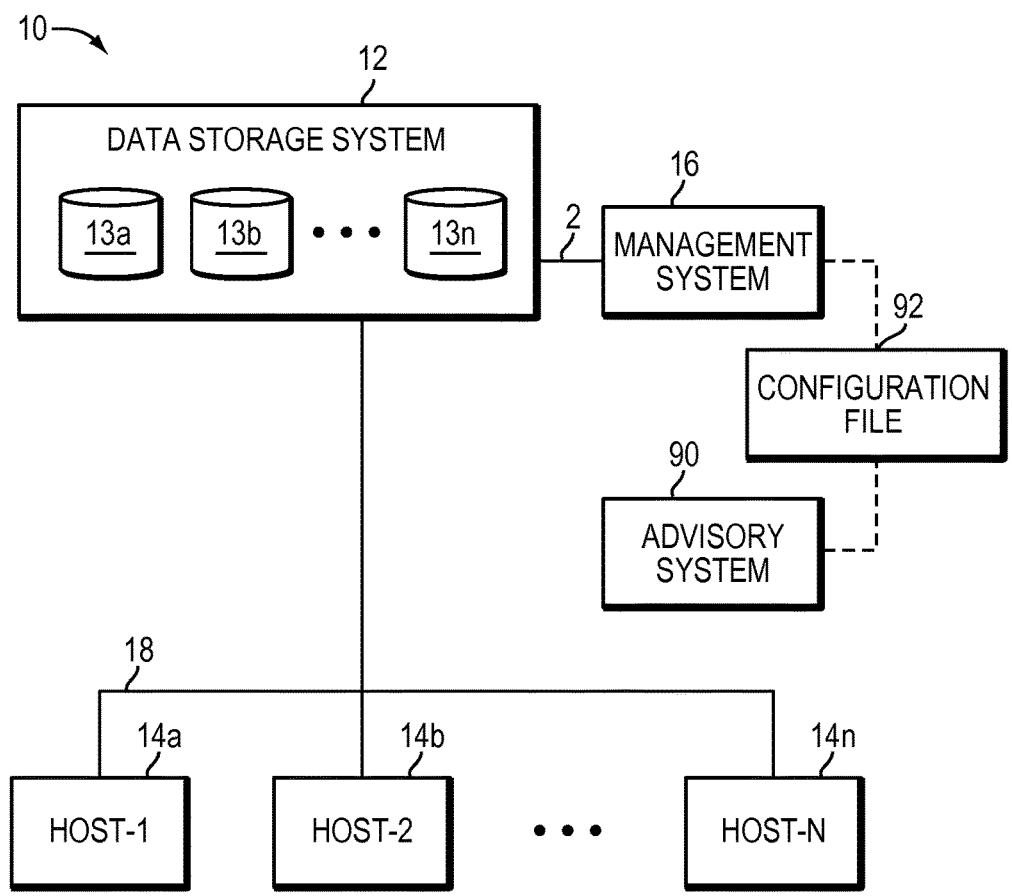
FIG. 1 is an example of an embodiment of a system that may utilize the techniques described herein.

Referring to FIG. 1, there is illustrated an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. Additionally, the system 10 comprises an advisory system for providing a configuration file 92 to the management system 16. The configuration file 92 can be provided to the management system 16 through a communication medium in order to assist in the configuration of the data storage system 12. This will be discussed in further detail below.

In this embodiment of the system 10, the management system 16, and the N servers or hosts 14a-14n may access the data storage systems 12, for example, in performing input/output (I/O) operations, data requests, and other operations. Additionally, in this embodiment, the advisory system 90 provides to the management system 16 optimal storage configuration settings for configuring the data storage system 12. It should be appreciated that in this embodiment the configuration provided to the management system 16 is the optimum storage configuration for a specific application using the data storage system 12. As a result of providing the optimum configuration to the management system 16, the management system 16 can configure the data storage system 12 based on the optimum storage configuration provided thereto.

The communication medium 18 may be any one or more of a variety of networks or other type of communication connections as known to those skilled in the art. Each of the communication mediums may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices or switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems, such as data storage arrays, offered by EMC® Corporation of Hopkinton, Mass. For example, an embodiment in accordance with techniques herein may include the VNX or VNXe™ storage systems by EMC® Corporation. Each of the data storage systems may include one or more data storage devices 13a-13n, such as disks. One or more data storage systems may be manufactured by one or more different vendors. Each of the data storage systems included in 12 may be inter-connected (not shown). As mentioned above, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

Described in following paragraphs are techniques that may be used to assist customers of a data storage system in connection with performing data storage services such as related to data storage system configuration, and the like. The techniques are flexible and allow for implementation of best practices which are customized for the particular application and/or underlying data storage system to meet specific customer needs.

Figure 2:
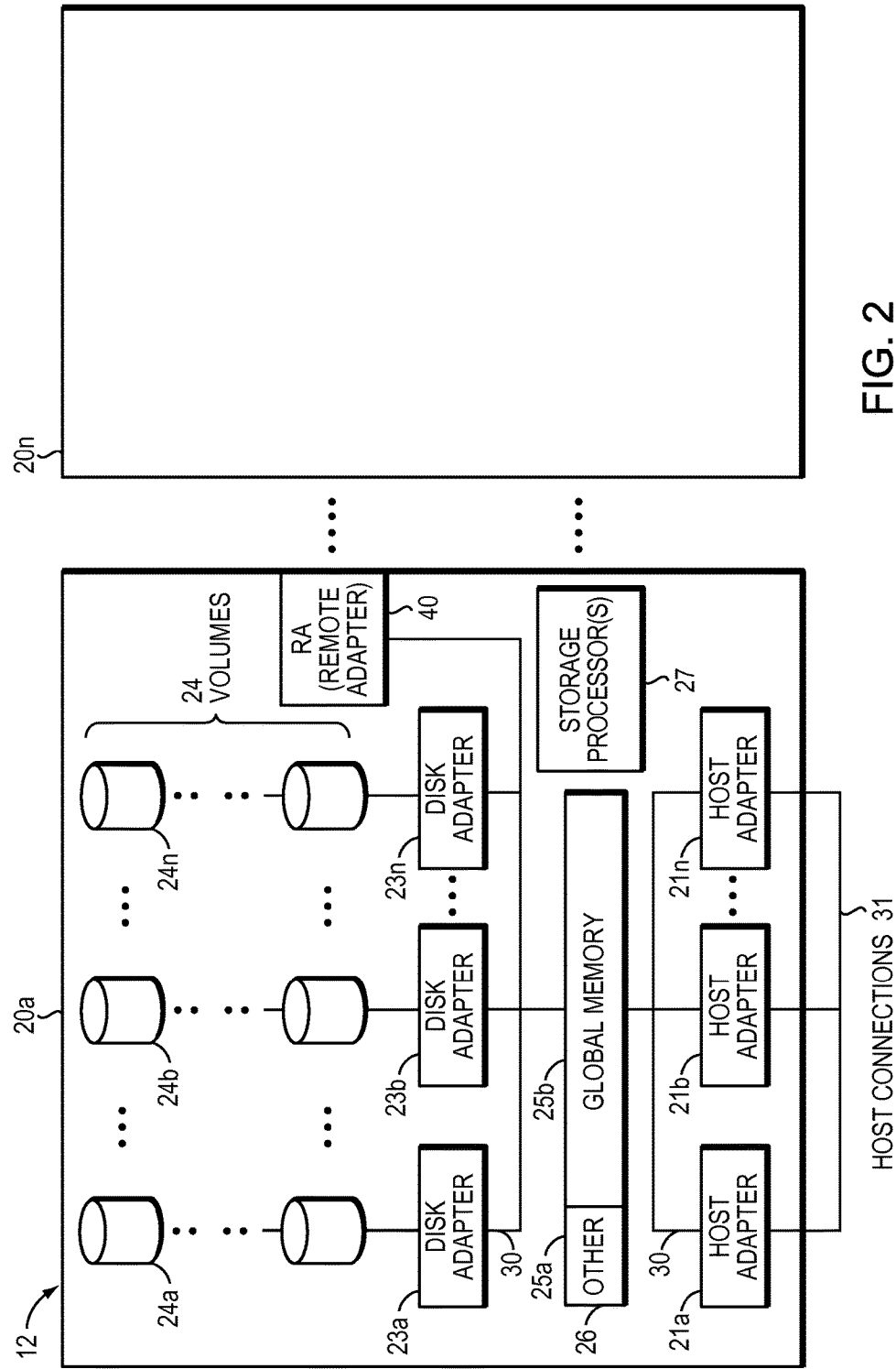
FIG. 2 is an example illustrating details of a data storage system in the system of FIG. 1.

Referring to FIG. 2, there is illustrated an example of an embodiment of the data storage system 12 in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. It should be noted that elements 24a-24n generally represent one or more different data storage devices analogous to elements 13a-13n of FIG. 1. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

Also shown in the storage system 20a is an RA or remote adapter 40. The RA may be hardware including a processor used to facilitate communication between data storage systems, such as between two of the same or different types of data storage systems.

The system 20a may also include one or more storage processors 27. Each of the storage processors 27 may be CPU and an embodiment may include any number of such processors. For example, the VNX or VNXe™ data storage systems by EMC Corporation includes two storage processors. The system 20a may also include one or more host adapters ("HAs") or directors 21a-21n. Each of the HAs may be used to manage communications and data operations between one or more host systems and the memory 26. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs (remote adapters), and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses and/or communication modules. In some embodiments of a data storage system, the memory 26 may be partitioned into two or more portions such as a global memory portion 25b and one or more other portions 25a. For example, in some embodiments of a data storage system including a single storage processor 27, the global memory portion 25b may be used to facilitate data transfers and other communications between the DAs, HAs and RAs in a data storage system. The DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, an embodiment of a data storage system, such as the VNX or VNXe™ data storage systems by EMC Corporation, may include multiple storage processors each with their own memory used for communication between the different front end and back end components rather than utilize a global memory accessible to all storage processors. In such embodiments, memory 26 may represent memory of each such storage processor.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Figure 3:
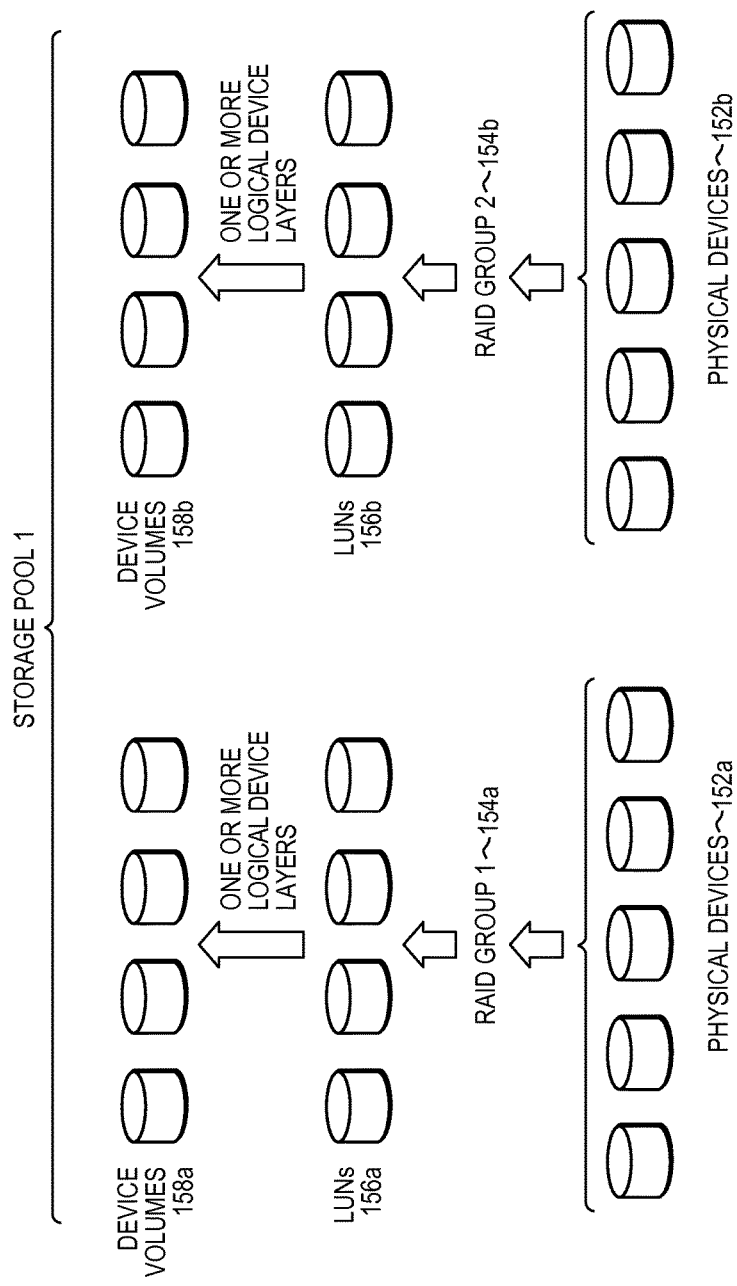
FIG. 3 is an example illustrating how storage pools may be configured.

Referring to FIG. 3, there is illustrated an example configuration of storage devices in the data storage system. In this example, the figure represents how storage pools may be formed from physical devices. The example 150 illustrates how storage pools may be constructed from groups of physical devices. For example, RAID Group 1 154a may be formed from physical devices 152a. A storage pool may have a particular RAID level and RAID configuration or layout for the type of storage pool being formed. For example, for physical devices 152a on a first data storage system type when forming a storage pool, RAID-5 may be used in a 4+1 configuration (e.g., 4 data drives and 1 parity drive). The RAID Group 1 154a may provide a number of data storage LUNs 156a. An embodiment may also utilize one or more additional logical device layers on top of the LUNs 156a to form one or more logical device volumes 158a. The particular additional logical device layers used, if any, may vary with the data storage system. It should be noted that there may not be a 1–1 correspondence between the LUNs of 156a and the volumes of 158a. In a similar manner, device volumes 158b may be formed or configured from physical devices 152b. The storage pool 1 of the example 150 illustrates two RAID groups being used to define a single storage pool although, more generally, one or more RAID groups may be used to form a storage pool in an embodiment using RAID techniques.

Figure 4:
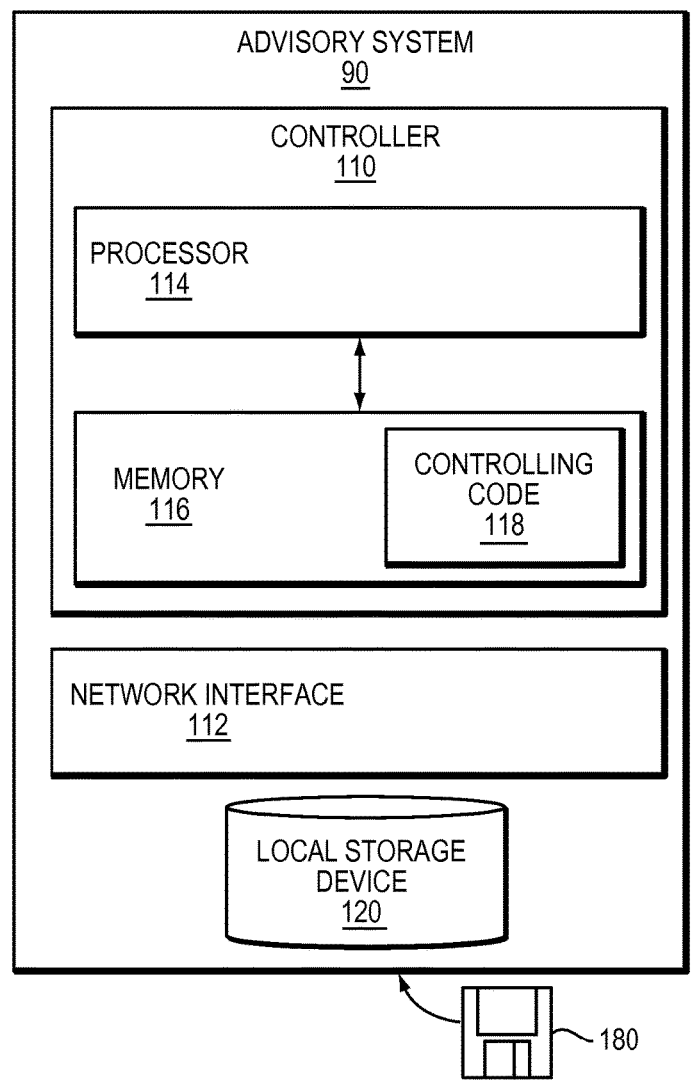
FIG. 4 is an example illustrating details of an advisory system that may utilize the techniques described herein.

Referring to FIG. 4, there is illustrated an example of an advisory system 90. In this example, the advisory system is configured for providing optimal storage configuration for a data storage system. The advisory system 90 includes controller 110, which in turn includes processor 114 and memory 116, and network interface 112. The advisory system 90 also includes a local storage device 120.

Memory 116 is configured to store controlling code 118 which includes instructions to provide optimal configurations for data storage systems. Memory 116 generally takes the form of, e.g., random access memory, flash memory or a non-volatile memory.

Processor 114 takes the form of, but is not limited to, Intel or AMD-based MPUs, and can include a single or multi-cores each running single or multiple threads. Processor 114 is coupled to memory 116 and is configured to execute the controlling code 118 stored in memory 116.

Network interface 112 is constructed and arranged to send and receive data over communication medium 22. Specifically, network interface 112 is configured to provide optimized configuration parameters for the data storage system to the managements system and/or the data storage system 12. The network interface is also configured to receive requests from an administrator or user to assist in the configuration of the data storage system.

Local storage device 120 can store best practices for facilitating the determination of optimal storage configuration for the data storage system 12. This will be described in further detail below.

It should be appreciated that the advisory system 90 as described herein can enable the storage administrator or other user to optimally configure storage for an application based on one or more sets of application-specific best practices. The application best practice can be implemented using a matrix of specified rule sets from which one is selected for a particular set of values. In use, an administrator or user may select one of the sets of best practices for the particular supported application by entering into the advisory system values of application workload parameters. For example, the administrator may enter application workload parameters in connection with a particular electronic mail application, such as Microsoft™ Exchange, or a particular database application. The processor 114 implementing the code 118 determines the appropriate best practice and subsequently determines the optimal configuration based on the input parameters and the determined best practice. The optimal configuration is sent using the network interface 112 to either the management system 16 or the data storage system 12. The optimal configuration is in a configuration file which can be interpreted by either the management system or the data storage system.

It should be appreciated that best practices are either customized for a particular application based on marketing analysis by product marketing group and/or test deployments in the laboratory by solution engineers. Thus, the determined best practices may be based on acquired knowledge through experience and know-how of skilled persons.

Figure 5:
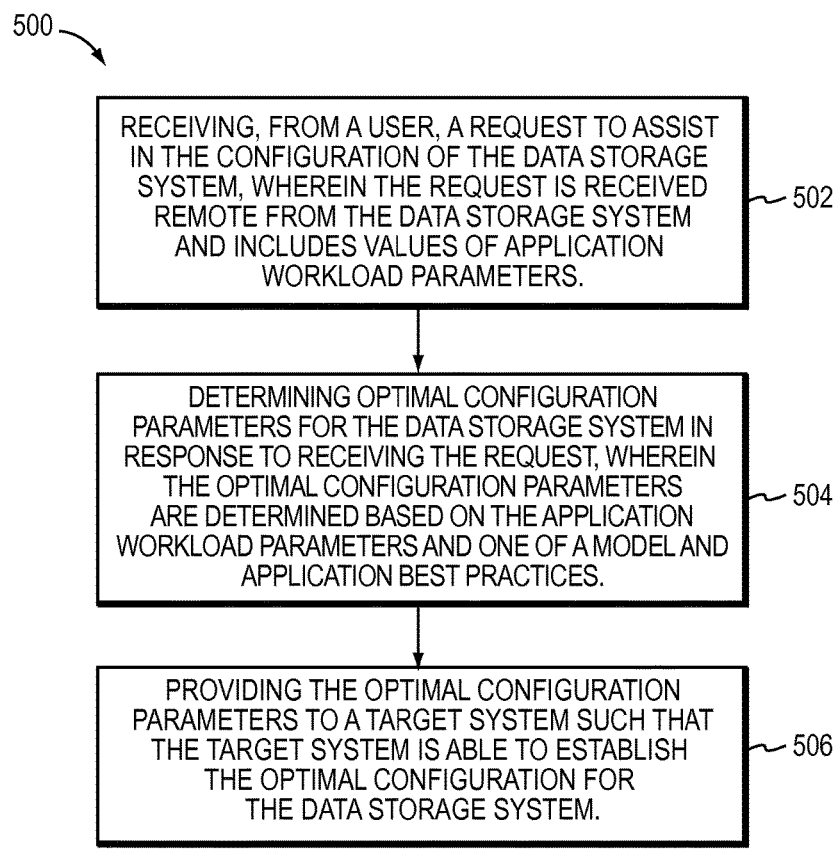
FIG. 5 is a flowchart of processing steps that may be performed by the advisory system of FIG. 4 in an embodiment in accordance with techniques herein.

Referring to FIG. 5, there is illustrated a method 500 for providing an optimal configuration for a data storage system. In the flow diagram, the operations are summarized in individual blocks. The operations may be performed in hardware, or as processor-executable instructions that may be executed by a processor such as the processor 114.

At step 502, a request is received from a user to assist in the configuration of the data storage system. It should be appreciated from the foregoing that the advisory system 90 can receive the request from the user. The request is received remote from the data storage system in the advisory system 90 and includes values of application workload parameters. For example, the parameters may be load-specific parameters.

At step 504, optimal configuration parameters are determined for the data storage system in response to receiving the request. The optimal configuration parameters are determined in the advisory system 90 based on the application workload parameters and one of a model and application best practices. For example, the optimal configuration parameters can be determined in the advisory system 90 based on the application workload parameters and application best practices. The optimal configuration parameters can also be determined in the advisory system 90 based on the application workload parameters and a model. This second part with respect to the model will be described in further detail below.

At step 506, the optimal configuration parameters are provided to a target system such that the target system is able to establish the optimal configuration for the data storage system. It should be appreciated from the foregoing that the optimal configuration parameters may be provided from the advisory system 90 to either the management system or direct to the data storage system.

Figure 6:
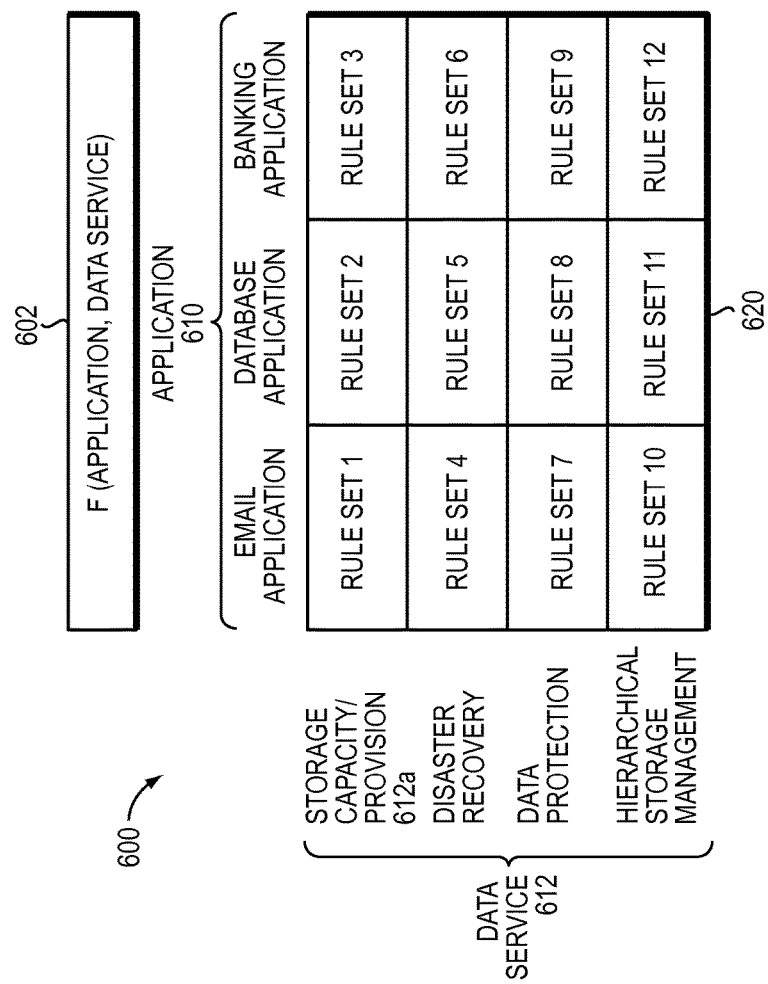
FIG. 6 is an example representation of a parameterized function and matrix that may be used in connection with rule set selection in an embodiment in accordance with techniques herein.

Referring to FIG. 6, there is illustrated a function that may be used to select a particular rule set. The rule sets represent best practices for specific applications. The example 600 illustrates mathematical function, F, in 602 representing in a parameterized form a function that may be used in connection with selecting a rule set. As described in more detail elsewhere herein, a rule set may be defined as a set of rules or mappings. The rule sets available for selection are illustrated by element 602. Element 620 is a matrix of specified rule sets from which one is selected for a particular set of values for the function F of 602. The matrix 620 uses a row index to indicate the rule sets for use with a particular data service 612 and a column index to indicate the rule sets for use with a particular application 610. Generally, data services may include any service that transforms or utilizes the data and/or the storage of the data. Exemplary data services include storage capacity/provisioning, disaster recovery, data protection, and hierarchical storage management. Storage capacity/provisioning data service may include operations to allocate storage. The disaster recovery data service may perform services to plan for possible drive failures. Disaster recovery services may include, for example, data replication. Data protection services may include, for example, providing data backups, encryption services, and the like. Hierarchical storage management services may provide services for managing the storage devices. Hierarchical storage management services may include, for example, moving data between different types of data storage devices such as between a fibre-channel data storage disk and an ATA (Advanced Technology Attachment) disk, between one of the foregoing disks and a tape, and the like. Other examples of services that may be included in an embodiment are retention services which focus on preventing deleting data until a certain time period and/or automated deletion of data after a specified time period, and classification services which may index content as stored to allow for other operations such as retrieval of content based on subsequent search criteria, categorization of data content, and the like. Example application of 610 may include an email application, a database application, and a banking application. It may also include as well a law office application, a medical office application, and the like. It should be noted that a same rule set may be specified for more than one entry in the matrix. An entry in the matrix may not specify a rule set indicating that the particular combination of application and data service is not supported. Other data services, as a category or included in a broader data service category, may provide for snapshots, cloning, migration, recovery, and the like.

It should be noted that application 610 can refer to a particular application category including one or more applications. For example, a column of 610 may refer to email applications as a category including multiple email applications from different vendors. However, a column of 610 may also be associated with a particular instance of an email application, such as Microsoft Exchange.

It will be appreciated by those skilled in the art that the number of dimensions of the function may vary from what is illustrated in FIG. 6. For example, the number of dimensions of the function may be three if a user grouping such as beginner and expert groupings are included.

Figure 7:
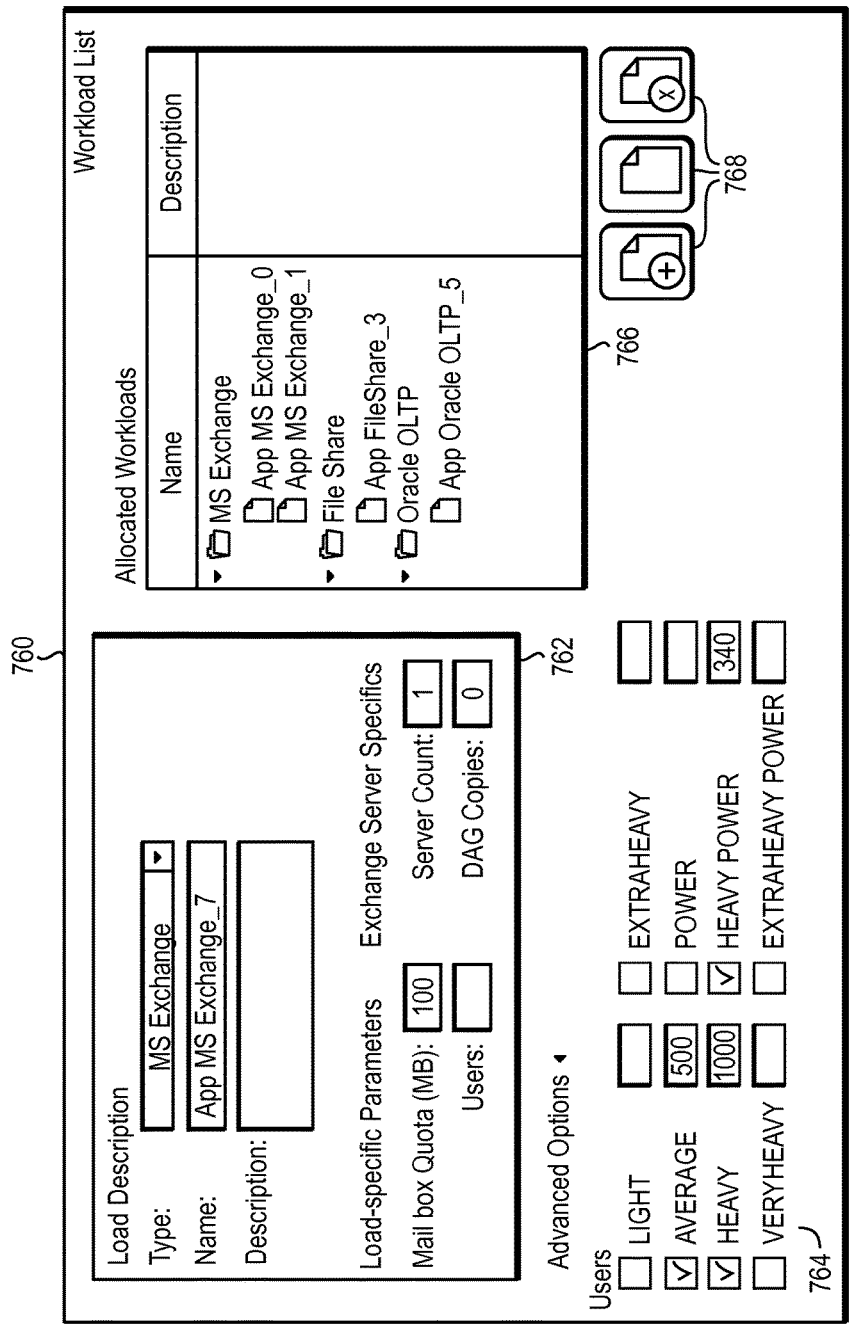
FIGS. 7 and 8 are examples of interfaces presented to the user in response to the implementation of at least some of the processing steps of FIG. 5 in an embodiment in accordance with techniques herein.

Referring to FIG. 7, there is illustrated an example browser window 760 from which a user is able to interact with the advisory system 90 and send a request to the advisory system 90. As mentioned above, the request sent to the advisory system requests assistance with the configuration of the data storage system Browser window 760 includes a load description pane 762, a user description pane 764, a load summary pane 766, and action buttons 768.

Load description pane 762 is configured to allow a client to input various details about a particular application that will generate a load on a storage system device when run. For example, the load description type, which is an application that will generate a load, is Microsoft® Exchange. In some arrangements, the load description type is a drop down menu of possible applications used in a particular vertical industry. For the particular application chosen, the client provides a load name, in this case, "App MS Exchange_7". For the load, the user inputs load-specific parameters which change for different applications. For example, load-specific parameters for Microsoft® Exchange take the form of a mailbox quota and a server count.

User description pane 64 is configured to allow the client to not only input the number of users of the storage system device, but also to provide weighting factors for each user depending on the expected load each user will generate. In the example provided in FIG. 7, load description pane provides eight categories of users.

Load summary pane 66 includes a list of all of the load names that were selected by the client in load description pane 62. It should be understood that load summary pane 66 may include more than one instance of an application, as shown in FIG. 7 in the FileShare application.

Action buttons 68 allow the user to add a new application and modify or remove an existing one.

Figure 8:
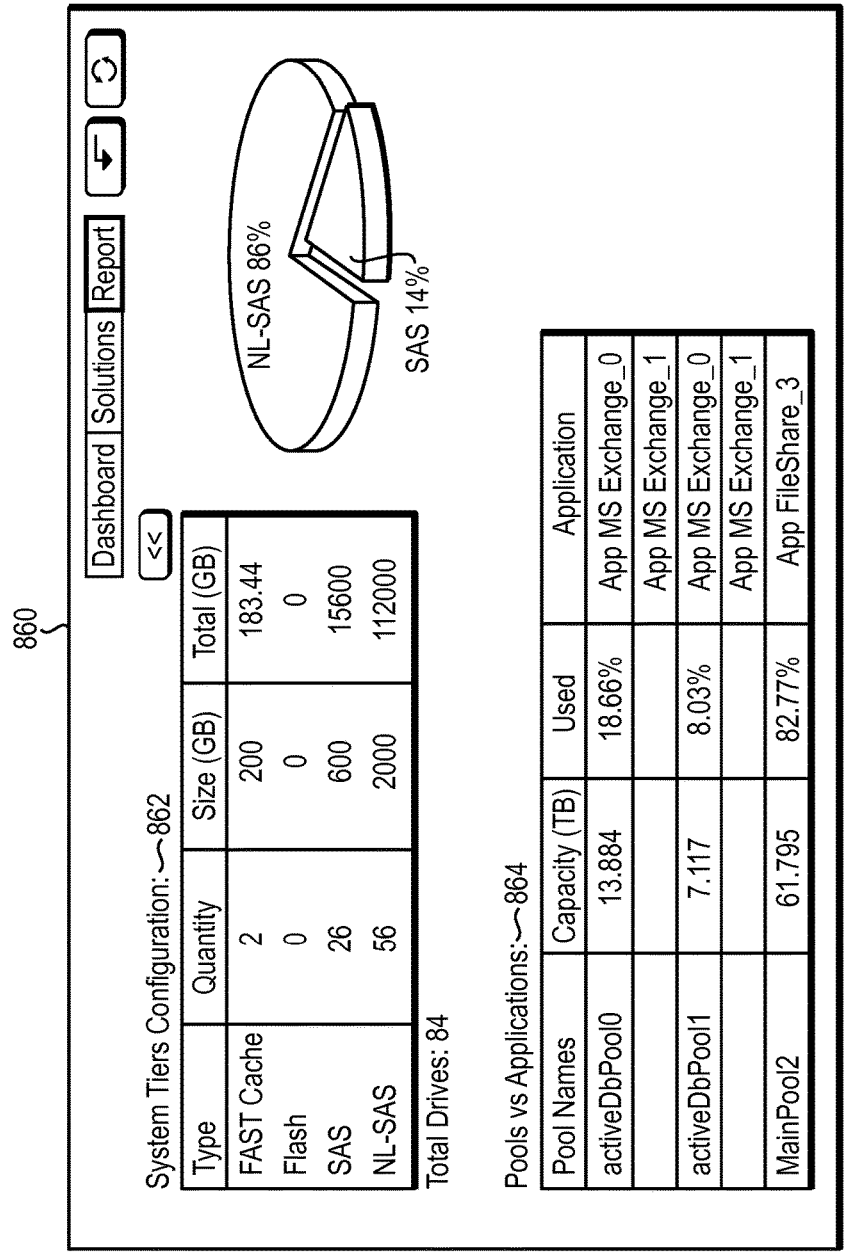

Referring to FIG. 8, there is illustrated an example browser window 860 showing the optimal storage configuration in response to receiving the request. Browser window 860 includes optimal system tiers configuration 862 and pools versus applications 864.

While the above description describes the advisory system communicating with the management system, it will be apparent to those skilled in the art that the advisory system may communicate with the data storage system. For example, the advisory system may provide the optimum configuration from the advisory system directly to the data storage system such that the data storage system is able to establish the optimal configuration for the data storage system. Alternatively, the advisory system may be incorporated within the management system for providing the optimum configuration for the data storage system.

While the above description describes determining the optimal configuration based on input parameters and best practices, it should also be appreciated that the optimal configuration can be determined based on input parameters and a model stored in the advisory system. In some arrangements, the model can take the mathematical form $$\text{performance} = f(\text{hardware, configuration, current state, usage scenario}),$$

where hardware represents the physical hardware components, configuration represents an array of configuration parameters, current state represents an input running state, and usage scenario is an storage system whose elements are defined by how the data storage system is expected to be used by a customer.

It should be understood that the usage scenario array, in some arrangements, takes a particular mathematical form:

$$\text{usage scenario} = g(\text{vertical, applications, workload characteristics, workload intensities})$$

The parameter vertical represents a vertical industry in which the data storage system is used (e.g., healthcare, oil & gas, financial, etc.). The parameter applications represents a particular application for which the data storage system is dedicated (e.g., online transaction processing (OLTP)/ Oracle, Data Warehousing/Teradata, Email/Exchange, etc.). Workload characteristics may represent a distribution of random reads, network file system (NFS)/common internet files system (CIPS) access patterns, etc. Workload intensities may represent an input/output operations per second (IOPS) hitting the storage system. In some arrangements, workload intensities identifies a classification of data into, e.g., hot and cold data.

While it is described above that the optimal configuration parameters are provided to a target system such that the target system is able to establish the optimal configuration for the data storage system, it should be understood that the configuration file created and the configuration file provided to the data storage system are not necessarily the same. The file from the advisory system may be a subset of the system's configuration or it might be recorded in some intermediate format to be interpreted and injected into system's configuration.

An embodiment may implement the techniques herein using a set of processors or other types of control/processing circuitry running software. In such arrangements, the software instructions can be delivered in the form of a computer program product (e.g., 180) having a computer readable storage medium which stores the instructions in a non-volatile manner. Alternative examples of suitable computer readable storage media include tangible articles of manufacture and apparatus such as CD-ROM, flash memory, disk memory, tape memory, and the like.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A computer-implemented method of providing optimal configurations for data storage systems, the method comprising:
receiving, by processing circuitry, a configuration query in connection with a data storage system, the configuration query including values of input parameters, the values of the input parameters representing one or more of a performance requirement and a capacity requirement, the configuration query further identifying an e-mail application for which configuration is required, a number of users associated with the e-mail application, a mail box quota, a server count and weighting factors for each user describing an expected load to be generated by each user;
inputting, by processing circuitry, the values of the input parameters and the e-mail application and the number of users and the mail box quota and the server count and the weighting factors into a predictive model that outputs configuration parameters, wherein the predictive model also inputs a current state of the data storage system and a input representing physical hardware components of the data storage system; and
sending, by processing circuitry over a network, values of configuration parameters to the data storage system, the configuration parameters being used to provide an optimal configuration for the data storage system that satisfies the configuration query.

2. A system of providing optimal configurations for data storage systems, the system comprising:
a network interface;
memory; and
a controller including controlling circuitry coupled to the memory, the controlling circuitry being constructed and arranged to:
receive a configuration query in connection with a data storage system, the configuration query including values of input parameters, the values of the input parameters representing one or more of a performance requirement and a capacity requirement, the configuration query further identifying an e-mail application for which configuration is required, a number of users associated with the e-mail application, a mail box quota, a server count and weighting factors for each user describing an expected load to be generated by each user;
input the values of the input parameters and the e-mail application and the number of users and the mail box quota and the server count and the weighting factors into a predictive model that outputs configuration parameters, wherein the predictive model also inputs a current state of the data storage system and a input representing physical hardware components of the data storage system; and
send, over a network, values of configuration parameters to the data storage system, the configuration parameters being used to provide an optimal configuration for the data storage system that satisfies the configuration query.

3. A computer program product having a non-transitory, computer-readable storage medium which stores code to provide optimal configurations for data storage systems, the code including instructions to:

receive a configuration query in connection with a data storage system, the configuration query including values of input parameters, the values of the input parameters representing one or more of a performance requirement and a capacity requirement, the configuration query further identifying an e-mail application for which configuration is required, a number of users associated with the e-mail application, a mail box quota, a server count and weighting factors for each user describing an expected load to be generated by each user;

input the values of the input parameters and the e-mail application and the number of users and the mail box quota and the server count and the weighting factors into a predictive model that outputs configuration parameters, wherein the predictive model also inputs a current state of the data storage system and a input representing physical hardware components of the data storage system; and send, over a network, values of configuration parameters to the data storage system, the configuration parameters being used to provide an optimal configuration for the data storage system that satisfies the configuration query.

* * * * *